United States Patent
Chen et al.

(10) Patent No.: US 9,310,671 B2
(45) Date of Patent: Apr. 12, 2016

(54) SIZE-ADJUSTABLE STEREO IMAGING CLAMPING DEVICE

(71) Applicant: Wistron Corporation, New Taipei (TW)

(72) Inventors: Jhih-Ming Chen, New Taipei (TW); Chia-Ching Lee, New Taipei (TW); Ta-Chun Hsiung, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 91 days.

(21) Appl. No.: 14/483,746

(22) Filed: Sep. 11, 2014

(65) Prior Publication Data
US 2015/0261004 A1  Sep. 17, 2015

(30) Foreign Application Priority Data
Mar. 11, 2014  (TW) .............................. 103108307 A (51) Int. Cl.
| | |
|---|---|
| *G09F 19/12* | (2006.01) |
| *G02B 27/22* | (2006.01) |
| *G03B 21/64* | (2006.01) |
| *G02B 6/42* | (2006.01) |
| *G03H 1/22* | (2006.01) |

(52) U.S. Cl.
CPC ................ *G03B 21/64* (2013.01); *G02B 6/426* (2013.01); *G02B 6/4244* (2013.01); *G02B 6/4261* (2013.01); *G02B 27/2271* (2013.01); *G03H 1/22* (2013.01)

(58) Field of Classification Search
CPC ...... G03B 21/64; G02B 6/4244; G02B 6/426; G02B 6/4261; G02B 27/2271; H04N 9/3173; H04N 13/049; H04N 13/04; H04N 9/31; G03H 1/22

USPC ........ 359/477; 29/33, 468; 294/139; 248/121, 248/424, 163.1, 176.1, 218.4, 231.21, 689; 408/75; 455/575.1, 575.3, 575.4
See application file for complete search history.

(56) References Cited

U.S. PATENT DOCUMENTS

| | | | | |
|---|---|---|---|---|
| 2,865,123 | A * | 12/1958 | Glowzinski | ..................... 40/209 |
| 8,118,272 | B2 * | 2/2012 | Liou | .......................... 248/287.1 |
| 2011/0234981 | A1 * | 9/2011 | Wang | .............................. 353/10 |

FOREIGN PATENT DOCUMENTS

| | | | | |
|---|---|---|---|---|
| CN | 204029326 | * | 7/2014 | ............. G09F 19/12 |
| TW | M388006 | | 9/2010 | |
| TW | M464703 | | 11/2013 | |

OTHER PUBLICATIONS

Taboola, http://www.pocket-lint.com/news/134817-how-to-turn-your-sm artphone-into-a-3d-hol ographic-di splay-for -under -5, Aug. 4, 2015.*

* cited by examiner

*Primary Examiner* — Jordan Schwartz
*Assistant Examiner* — George G King
(74) *Attorney, Agent, or Firm* — Muncy, Geissler, Olds & Lowe PC (57) ABSTRACT

A stereo imaging device is disclosed. The stereo imaging device includes a pair of holders, an imaging element, an association pillar and a pair of isometric beams. The holders are used to clamp a handheld electronic device. The imaging element includes a bottom plate having a guide slot and is movably connected to the two holders. The association pillar is fastened in the guide slot and can be moved in the guide slot along a first axis. One end of each of the two beams is pivotally connected to the association pillar, and the other ends of the beams are respectively connected to the top plates of the two holders.

9 Claims, 8 Drawing Sheets

SIZE-ADJUSTABLE STEREO IMAGING CLAMPING DEVICE

BACKGROUND OF THE INVENTION

1. Field of the Invention

The present invention relates to a stereo imaging device, and more particularly, to a stereo imaging device that is easily portable, size-adjustable, and able to use a handheld electronic device as its projection light source.

2. Description of the Related Art

As technology develops, 3D stereo imaging has become a key technology that device manufacturers make great efforts to develop. When images are displayed with 3D imaging, the user has a heightened sense of reality when watching videos, so 3D stereo imaging is becoming more and more popular. Nowadays, various electronic devices, such as 3D television and 3D glasses are provided to allow users to watch 3D images and videos. However, all of these products form a 3D image through the difference between the visual angles of two eyes, and the products provide users only 3D images taken or filmed from a specific angle of view; thus, they cannot enable users to see images captured from different angles of view along with different visual angles. In order to improve this drawback, "3D Holographic Projection" technology has been developed.

3D Holographic Projection techniques, which involve the coordination of software and hardware, project 2-dimensional views of an object image in four directions, such as a front view, back view, left view and right view, onto four lateral sides of a square-based pyramid. The square-based pyramid is made of special transparent material, and the light of the images projected on the four lateral sides together compose a 3D image via reflection and refraction of the light. However, this technique of projecting imaging requires expensive projection equipment, and the equipment is too large to be easily portable.

SUMMARY OF THE INVENTION

A primary object of the present invention is to provide a stereo imaging device that is easily portable, size-adjustable, and able to use a handheld electronic device as its projection light source.

To achieve the above-mentioned object, the size-adjustable stereo imaging clamping device of the present invention comprises a pair of holders, an imaging element, an association pillar and a pair of isometric beams. Two holders are disposed oppositely to each other, wherein the pair of holders further comprises clamping elements, at least one support pillar and a top plate. The clamping elements of the two holders are used to clamp the handheld electronic device. One end of the support pillar is connected to the clamping element, and the top plate is connected to the other end of the support pillar. The imaging element is a square-based pyramid composed of a bottom plate and four transparent plates, wherein the transparent plates are respectively each lateral side of the square-based pyramid and the bottom plate is the bottom side of the square-based pyramid; the bottom plate is movably connected to the top plate, and when clamping elements clamp the handheld electronic device, the imaging element is located between the top plate and the handheld electronic device, wherein the bottom plate has a guide slot. The association pillar is fastened to the guide slot and can be moved along a first axis X in the guide slot. One end of each of the two isometric beams is pivotally connected to the association pillar, and the other ends are respectively pivotally connected to two places on the top plates of the two holders. Thereby, when there is a displacement of the association pillar in the guide slot, each drive of the isometric beams enables the two top plates of the holders to move along a second axis Y to vary their distance from each other, wherein the first axis X and second axis Y are essentially mutually perpendicular.

According to an embodiment of the present invention, the lengths of the pair of isometric beams are the same, and the distances between the two places pivotally connected to one end of each isometric beam and all points on the median line paralleling the first axis of the guide slot are essentially the same. Thereby, when there is a displacement of the association pillar in the guide slot, each drive of the isometric beams enables the two top plates of the holders to move equal distances closer to or away from each other.

According to an embodiment of the present invention, the stereo imaging device of the present invention further comprises a pair of elastic elements, one end of each of which is connected to one of the pair of the holders and the other end of each of which is connected to the other holder.

According to an embodiment of the present invention, each top plate of the holders comprises a pair of hooks, and the hooks of a top plate correspond to the other hooks of the other top plate. The two ends of each elastic element are respectively connected to the corresponding hooks of the top plates.

According to an embodiment of the present invention, the top plate comprises a pair of slides, and two corresponding sides of the bottom plate respectively extend two corresponding fringes of the square-based pyramid to form flanges for being fixed to each slide.

According to an embodiment of the present invention, when the pair of the clamping elements clamp the handheld electronic device, the top of the square-based pyramid touches a surface of the handheld electronic device.

According to an embodiment of the present invention, the guide slot comprises an installing hole and the association pillar comprises a screw. The bore diameter of the installing hole is greater than the bore diameter of the screw head of the screw such that the screw can be fastened in the guide slot via the installing hole.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

To clarify the above and other purposes, features, and advantages of this invention, a specific embodiment of this invention is especially listed and described in detail with the attached figures as follows.

Please refer to FIG. 1 to FIG. 4, which present schematic drawings of the structure of a stereo imaging device according to the present invention.

Figure 1:
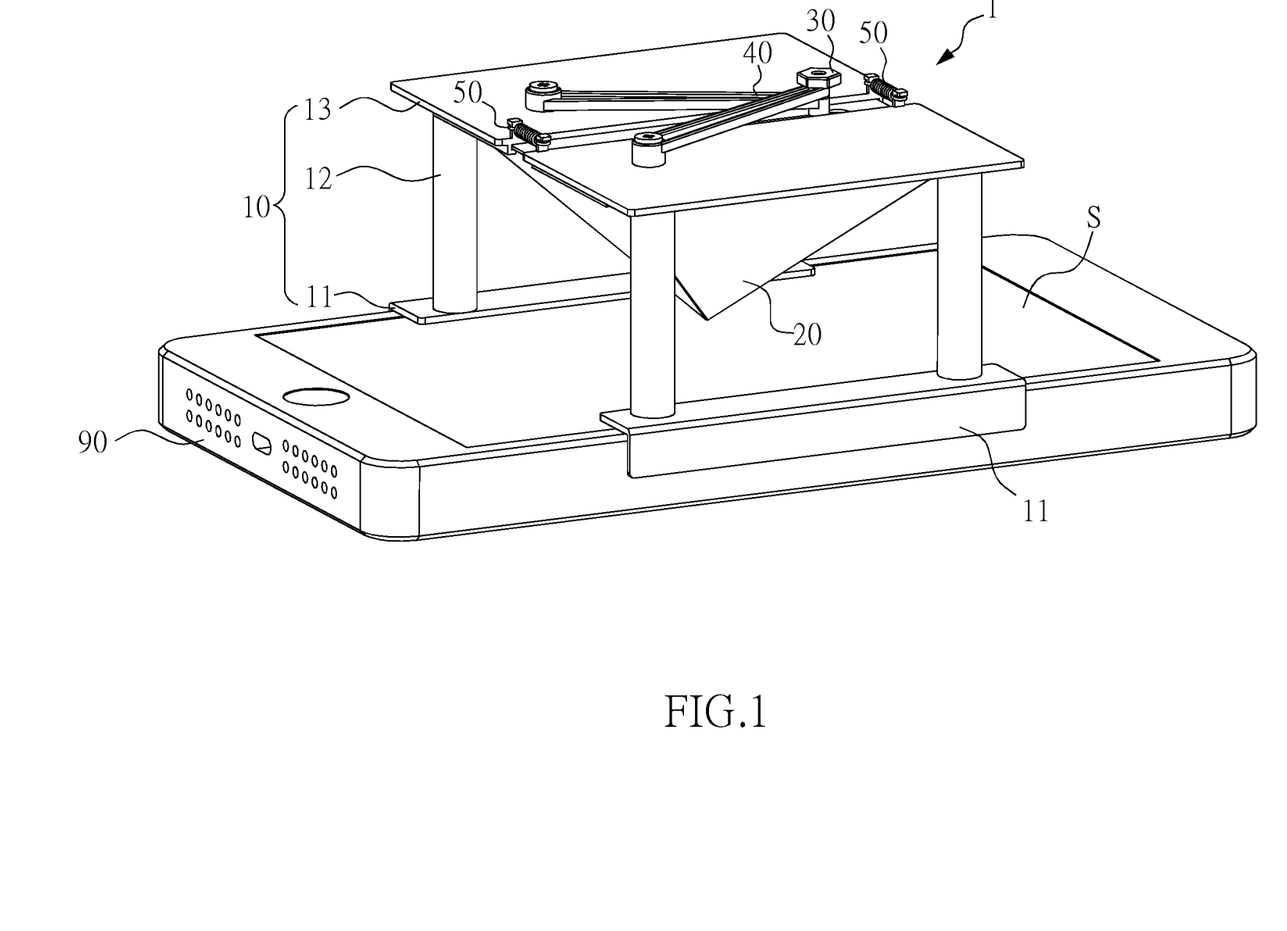
FIG. 1 is a schematic perspective drawing of a stereo imaging device according to the present invention.

FIG. 1 presents an embodiment of the present invention illustrating that a stereo imaging device 1 of the present invention can be used in combination with a handheld electronic device 90, such as a smartphone or tablet computer. The handheld electronic device 90 provides a projection function that is able to project light on the stereo imaging device 1 to form a 3D image through the projection of the handheld electronic device 90. Furthermore, the handheld electronic device 90 provides a software program to execute the holographic projection technique. When the handheld electronic device 90 accesses and executes the software program, it can cast the projection light for the 3D image. Because the software that is able to execute the holographic projection technique is a well-known art, the principle of which is shown in many patents and disclosed documents of technique, it is not the primary issue of the present invention and requires no further description.

Figure 2:
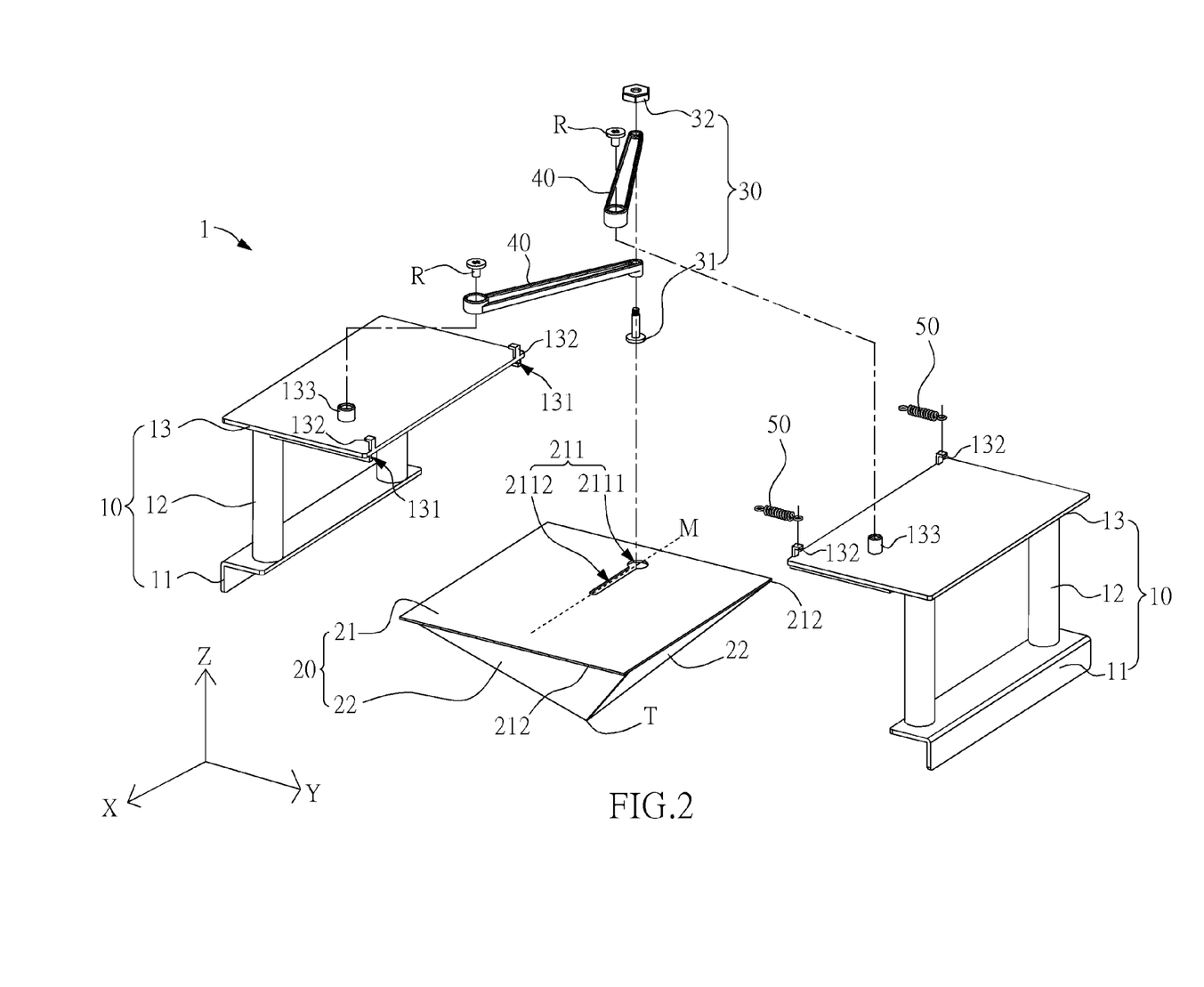
FIG. 2 is an exploded perspective drawing of a stereo imaging device according to the present invention.

FIG. 2 presents an embodiment of the present invention illustrating that the stereo imaging device 1 of the present invention comprises a pair of holders 10, an imaging element 20, an association pillar 30, a pair of isometric beams 40 of equal length, and a pair of elastic elements 50.

FIG. 1 and FIG. 2 present an embodiment of the present invention illustrating that the two holders 10 are disposed oppositely to each other, wherein each holder 10 further comprises a clamping element 11, at least one support pillar 12 and atop plate 13. The clamping elements 11 of the two holders 10 are used to clamp the handheld electronic device 90. One end of each of the two support pillars 12 of each holder 10 is connected to each clamping element 11. The other ends of the two support pillars 12 of the two holders 10 are respectively connected to the top plates 13 of the two holders 10, wherein each top plate 13 comprises a pair of corresponding slides 131, a pair of hooks 132 and a position pillar 133. The slides 131 are disposed under the surface of the top plate 13, and the hooks 132 and the position pillar 133 are disposed above the surface of the top plate 13. Two hooks 132 of a top plate 13 correspond to two hooks 132 of the other top plate 13, and two position pillars 133 of the two top plates 13 are disposed oppositely to each other.

Figure 4:
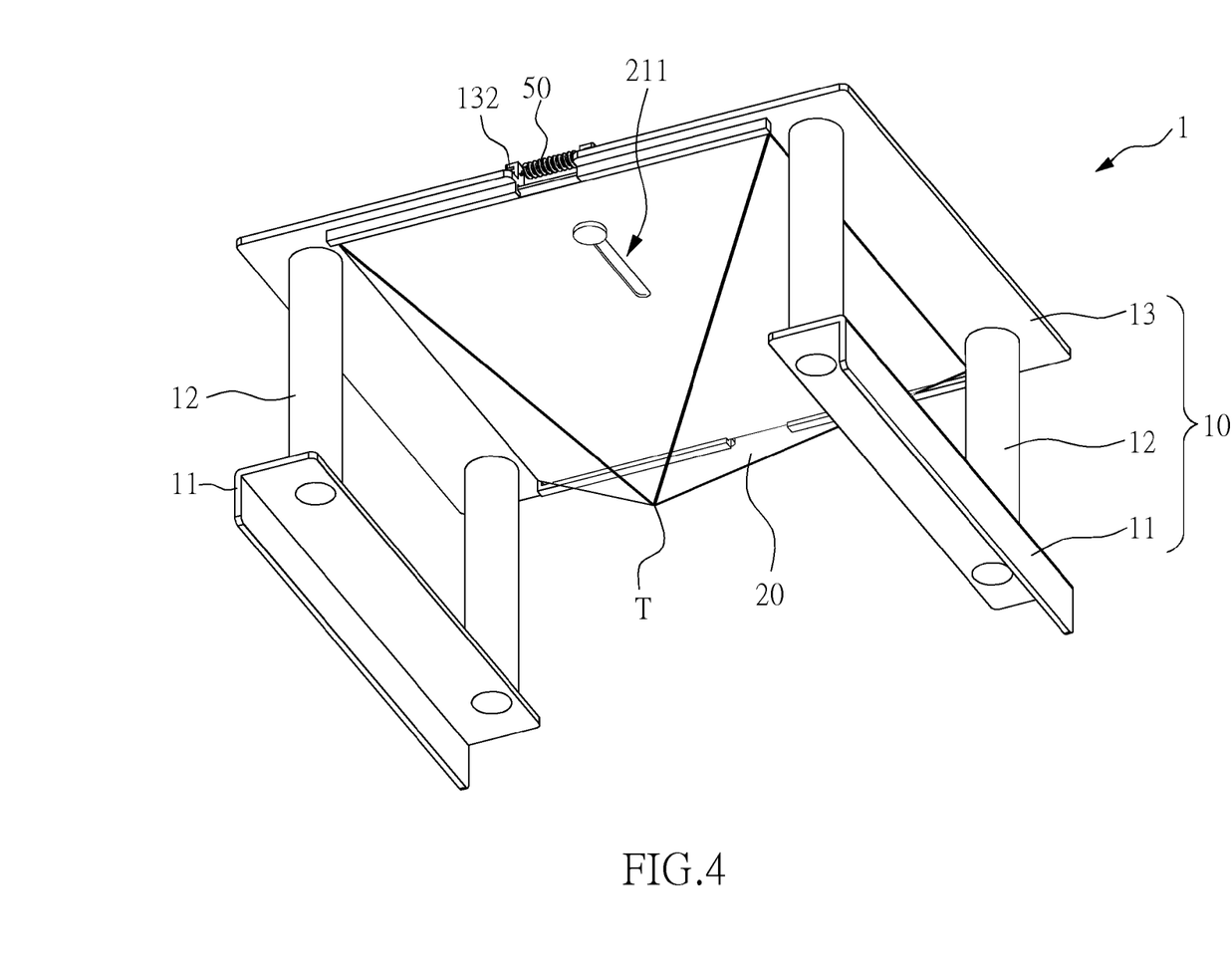
FIG. 4 is a bottom view of a stereo imaging device according to the present invention.

FIG. 1, FIG. 2 and FIG. 4 present an embodiment of the present invention illustrating that an imaging element 20 is a square-based pyramid composed of a bottom plate 21 and four transparent plates 22. The four transparent plates are respectively each lateral side of the square-based pyramid, and the bottom plate 21 movably connected to the top plate 13 is the bottom side of the square-based pyramid. The bottom plate 21 comprises a guide slot 211, wherein the guide slot 211 comprises an installing hole 2111 and a slot 2112. Two corresponding sides of the bottom plate 21 respectively extend two corresponding fringes of the square-based pyramid to form flanges 21 for being fixed to each of the slides 131, such that the bottom plate 21 is movably combined under the surface of the top plate 13. When the clamping elements 11 clamp the handheld electronic device 90, the imaging element 20 is located between the top plate 13 and the handheld electronic device 90. That is, the height of the imaging element 20 is not higher than the length of the support pillar 12. When the clamping elements 11 clamp the handheld electronic device 90, the top T of the square-based pyramid (imaging element 20) slightly touches a surface S of the screen of the handheld electronic device 90.

In one embodiment of the present invention, the association pillar 30 comprises a screw 31 and a nut 32. The bore diameter of the screw head of the screw 31 is smaller than the bore diameter of the installing hole 2111 such that the screw 31 can be fastened in the guide slot 211 via the installing hole 211. After the screw 31 inserted, it is fastened in combination with the nut 32 so as to make the association pillar 30 movably fastened in the guide slot 211 and movable in the guide slot 211 along a first axis X (because the guide slot 211 is bar-shaped).

Figure 3:
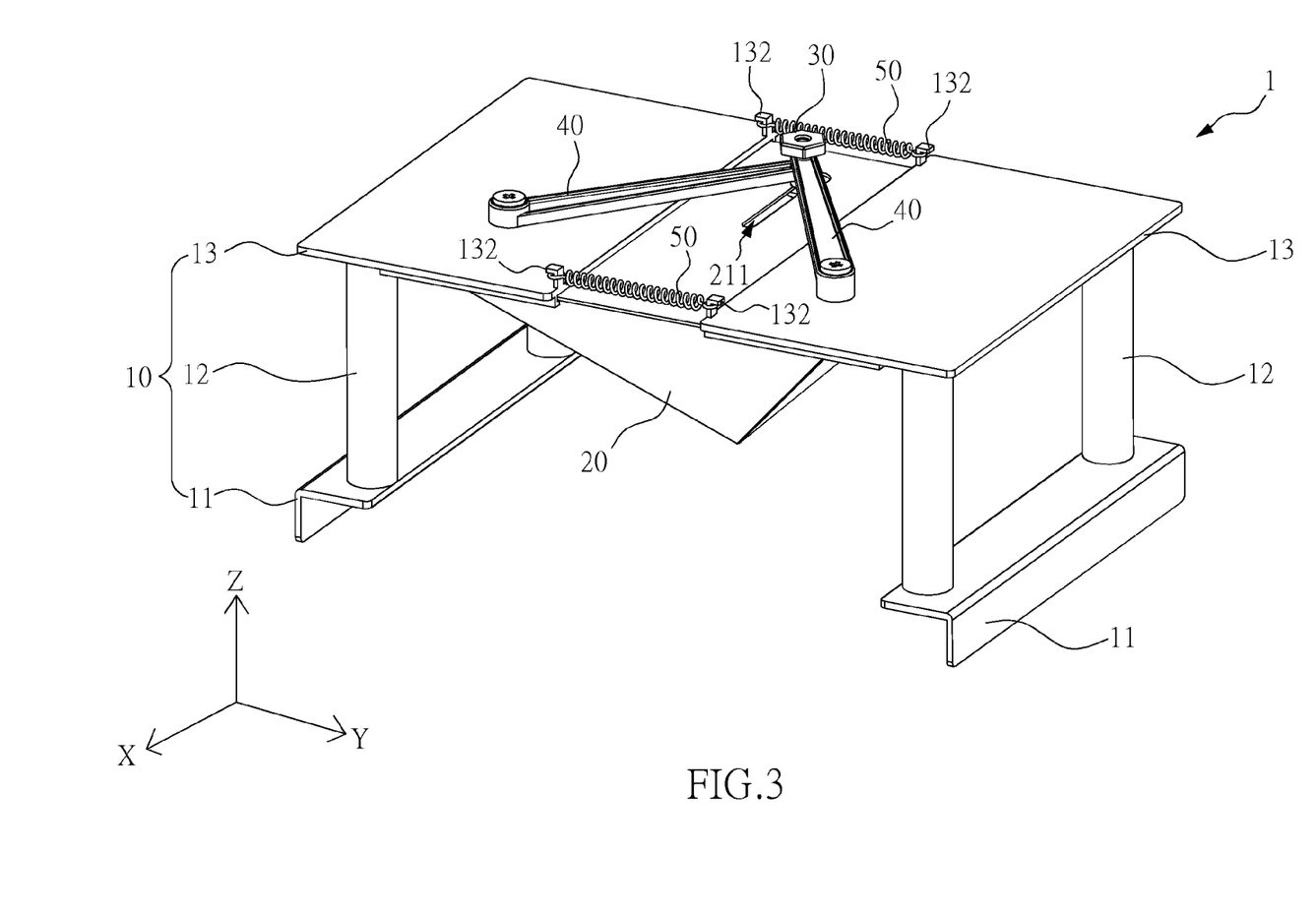
FIG. 3 is a vertical view of a stereo imaging device according to the present invention.

FIG. 2 and FIG. 3 present an embodiment of the present invention illustrating that one end of each of the two isometric beams 40 is pivotally connected to the screw 31 of the association pillar 30 and the other ends are respectively pivotally connected to the position pillars 133 of the top plate 13 of the two holders 10 via the fastenings of rivets R. The distances between the two position pillars 133 (the two places pivotally connected to one end of each of the isometric beams 40) and every point along the median line M paralleling the first axis X of the guide slot 211 are essentially the same. That is, wherever the association pillar 30 in the guide slot 211 is moved to, an isosceles triangle is surrounded by three points of the association pillar 30 and two position pillars 133.

In one embodiment of the present invention, one end of each of the two elastic elements 50 is respectively connected to two hooks 132 of one holder 10 of the pair of the holders, and the other ends are respectively connected to two hooks 132 of the other holder 10. Two elastic elements 50 are used to provide the needed elasticity for the clamping elements 11 to close the two holders 10 so as to clamp the handheld electronic device 90. In the embodiment of the present invention, the elastic element 50 is a telescopic spring, but the invention is not limited to that design.

Please refer to FIG. 5 to FIG. 8 together, which present schematic drawings of the movement of the stereo imaging device according to the present invention.

Figure 5:
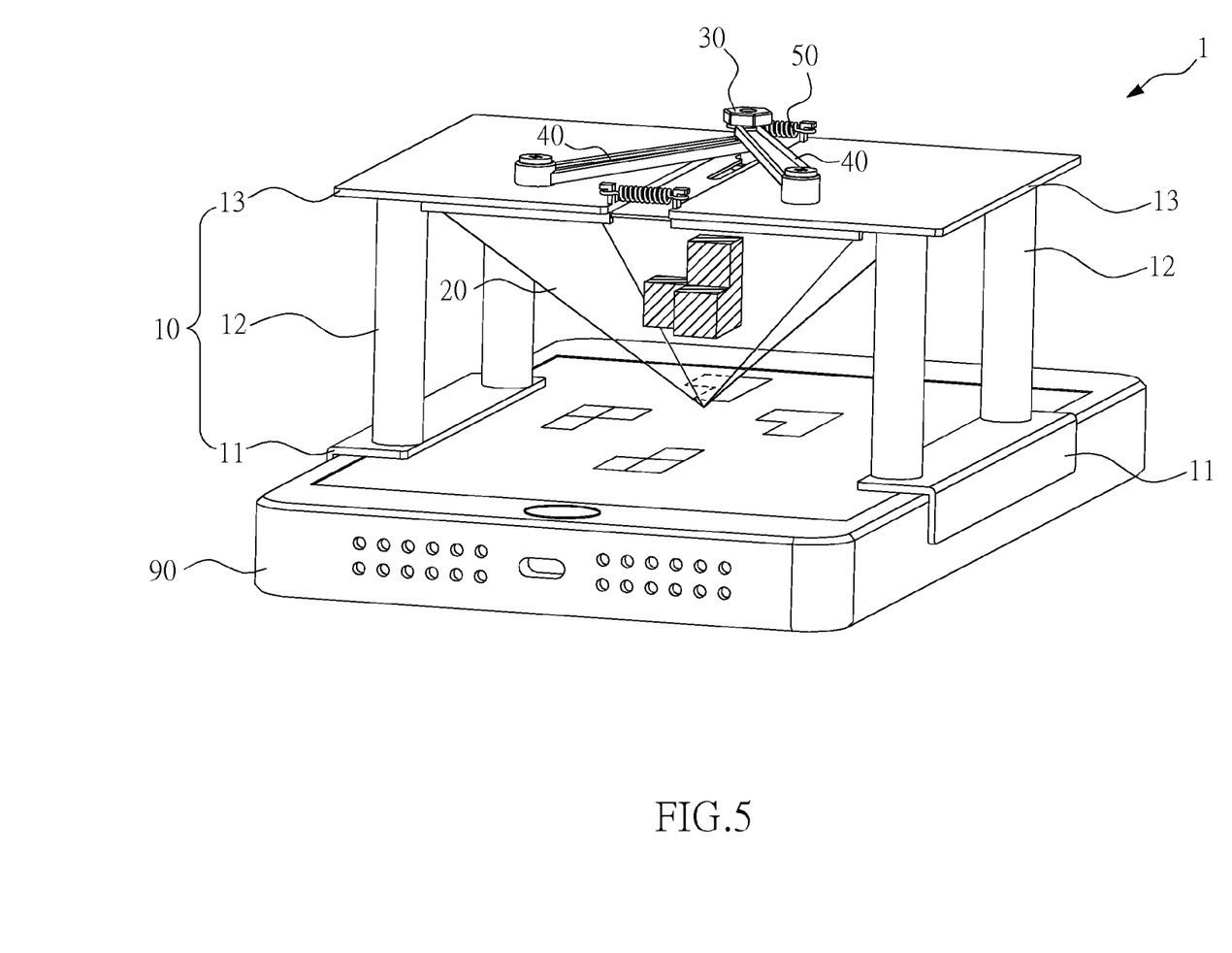
FIG. 5 is a schematic drawing of a stereo imaging device combined with a handheld electronic device of smaller size according to the present invention.
Figure 6:
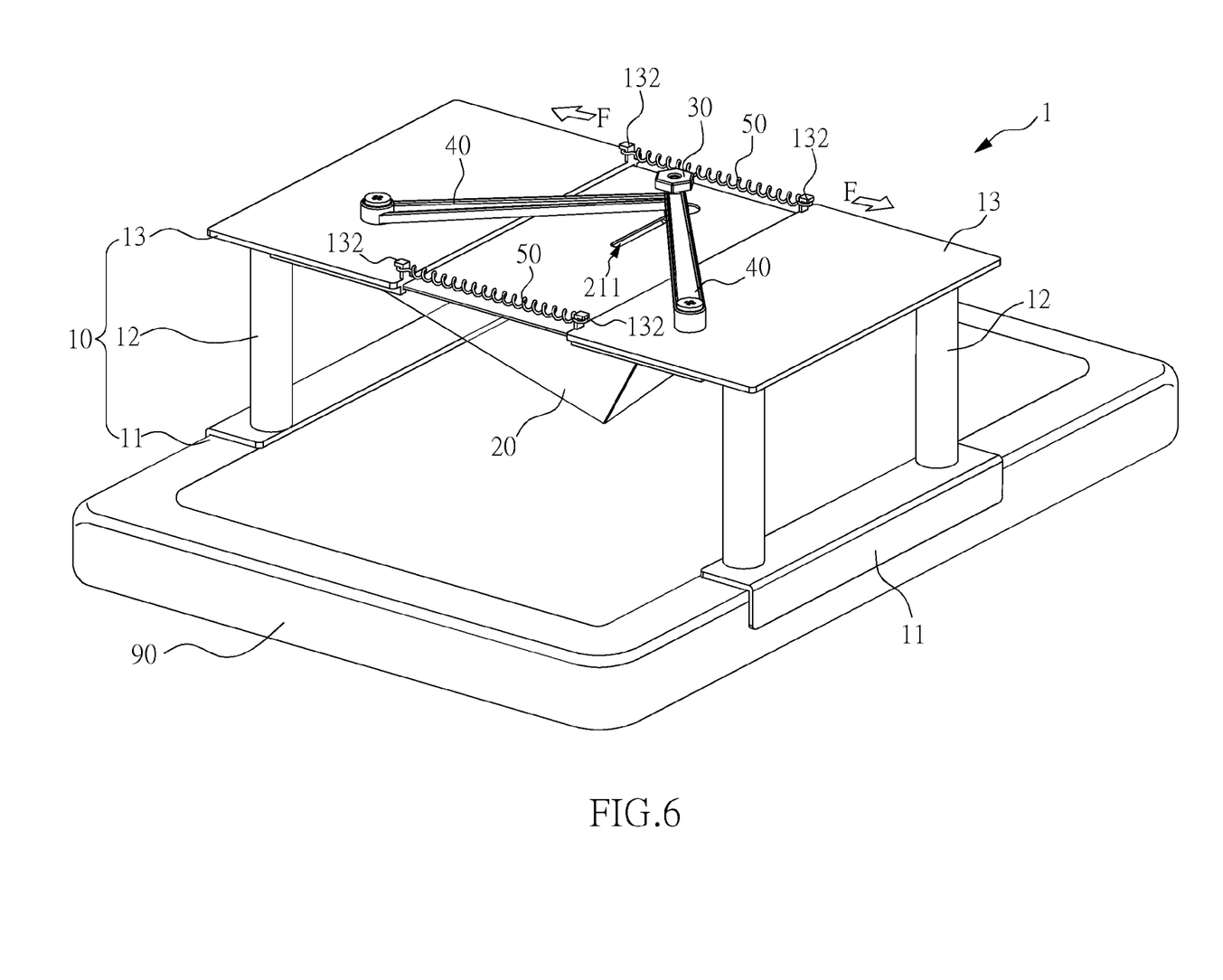
FIG. 6 is a schematic drawing of a stereo imaging device combined with a handheld electronic device of greater size according to the present invention.
Figure 7:
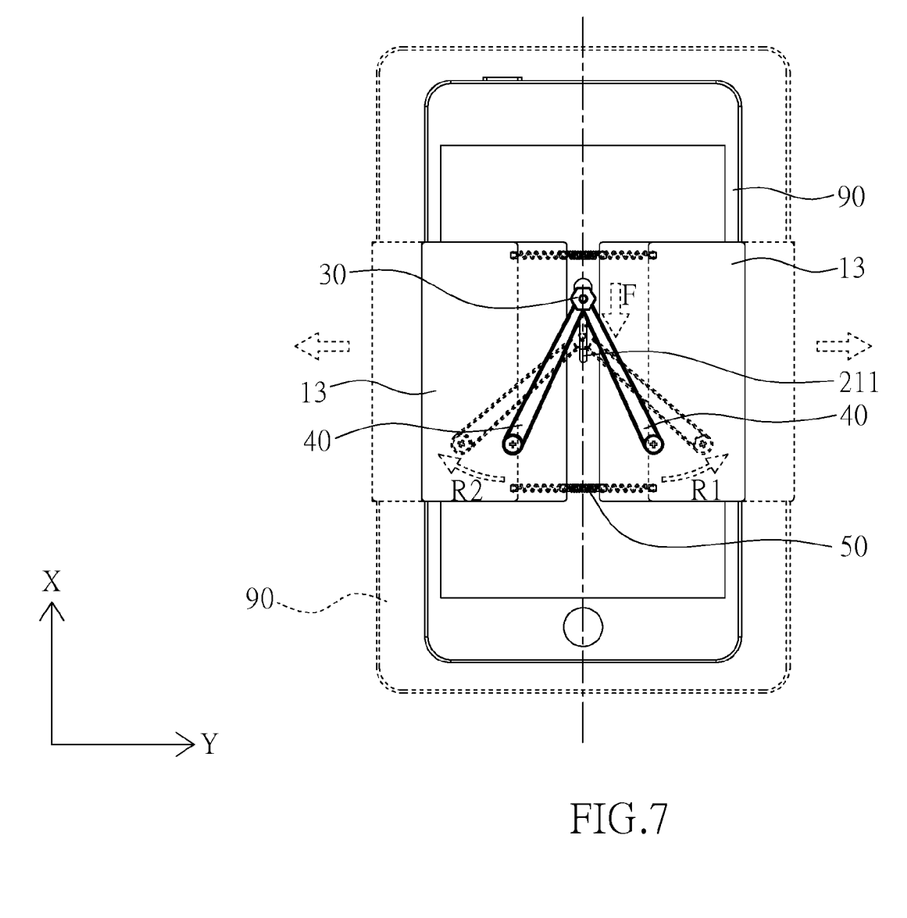
FIG. 7 is a movement schematic drawing of two holders moving equal distances closer to or away from each other according to a stereo imaging device of the present invention.
Figure 8:
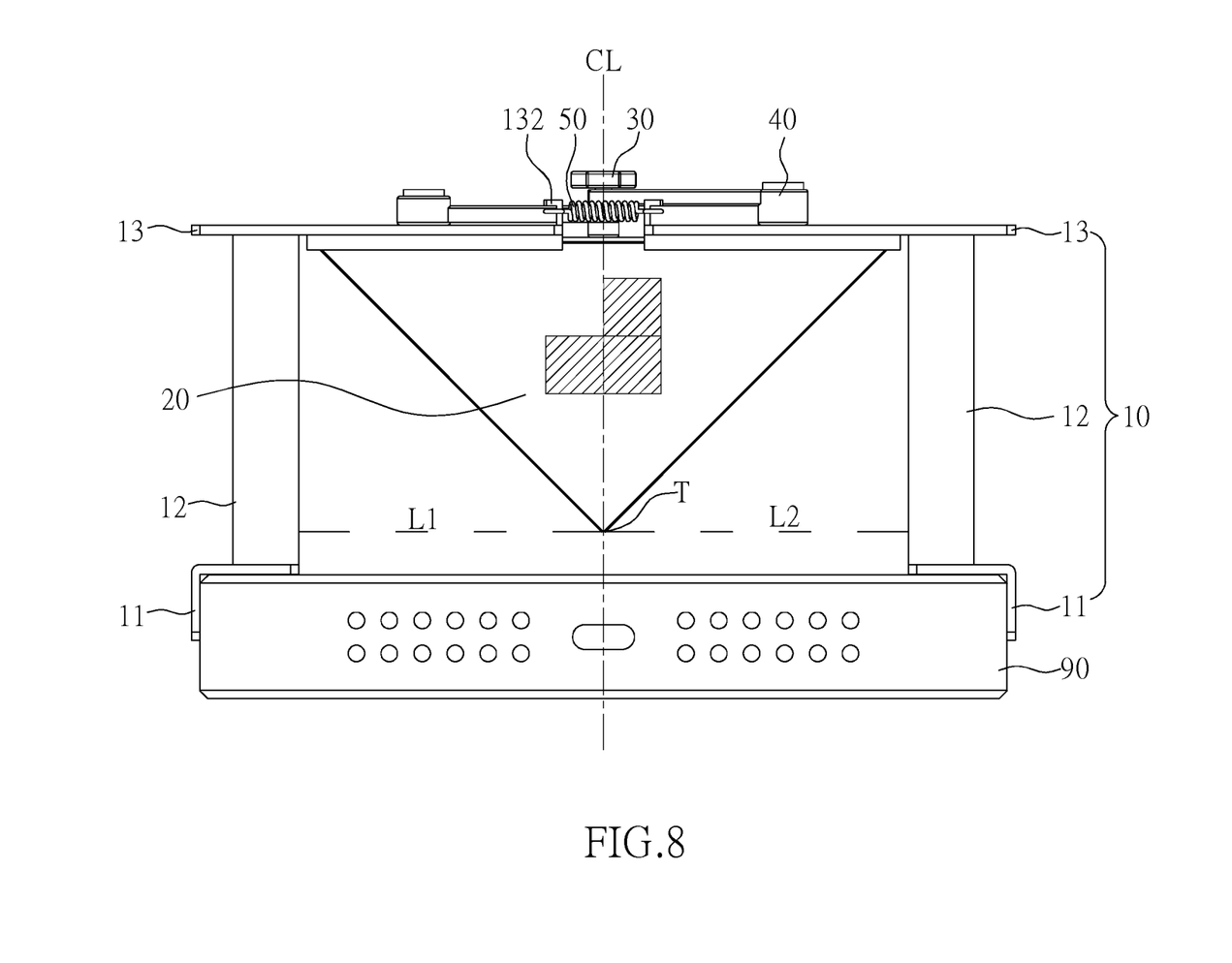
FIG. 8 is a lateral view of a stereo imaging device combined with a handheld electronic device according to the present invention.

As shown in FIG. 5, FIG. 6 and FIG. 7, the distances of the two holders 10 of the stereo imaging device 1 are adjustable so as to fit the stereo imaging device 1 of the present invention to handheld electronic devices 90 of various sizes. FIG. 5 presents a schematic drawing of the use of the imaging device 1 in combination with a smaller handheld electronic device 90, such as a smartphone, and FIG. 6 presents a schematic drawing of the use of the imaging device 1 in combination with a larger handheld electronic device 90, such as a tablet computer. When the user adjusts the distance between the two holders 10 by moving one of the holders 10, the isometric beam 40 connected to the moved holder 10 drives a movement of the association pillar 30 in the guide slot 211 (as indicated by the arrow F in FIG. 7). The other holder 10 is moved simultaneously because the association pillar 30 also drives the other isometric beam 40 to rotate. Because the distances of the two isometric beams 40 are the same, the isometric beams 40 rotate the same number of degrees oppositely (as indicated by the arrows R1, R2 in FIG. 7), and the distances that they move are also the same in opposite directions. That is, the two holders 10 move equal distances closer to or away from each other along a second axis Y indicated in FIG. 7, wherein the second axis Y and the first axis X are essentially mutually perpendicular. As shown in FIG. 8, the vertical distances between the top T of the square-based pyramid and two support pillars L1, L2 remain the same due to the abovementioned design of the mechanism. In this way, when the clamping elements 11 clamp two sides of handheld electronic devices 90 of various sizes, the top T will be located in the middle of the two sides such that the user is able to align the middle of the screen of the handheld electronic device 90 with the top T. Thereby, the light cast by the handheld electronic device 90 will be projected on the imaging element 20 precisely so as to form a 3D image in the imaging element 20 (as shown in FIG. 5).

As described above, the stereo imaging device 1 of the present invention can be easily used in combination with a handheld electronic device 90 to provide the function of 3D Holographic Projection. The volume of the device is sufficiently small that it is easily portable, and handheld electronic devices 90 of various sizes can be combined with the device. Therefore, the prior drawbacks are effectively ameliorated.

It should be noted that, although a few exemplary embodiments of the present invention have been shown and described, the present invention is not limited to the described exemplary embodiments. Instead, it will be appreciated by those skilled in the art that changes may be made to these exemplary embodiments without departing from the principles and spirit of the invention, the scope of which is defined by the claims and their equivalents.

What is claimed is:

1. A size-adjustable stereo imaging clamping device comprising:
   a pair of holders disposed oppositely to each other, wherein the pair of holders further comprises:
      a clamping element used to clamp a handheld electronic device;
      at least one support pillar, one end of which is connected to the clamping element; and
      a top plate connected to the other end of the at least one support pillar;
   an imaging element that is a square-based pyramid composed of a bottom plate and four transparent plates, wherein the transparent plates are respectively each lateral side of the square-based pyramid and the bottom plate, which is movably connected to the top plate, is the bottom side of the square-based pyramid and has a guide slot, such that when the clamping element clamps the handheld electronic device, the imaging element is located between the top plate and the handheld electronic device;
   an association pillar fastened to the guide slot and able to move along a first axis back and forth in the guide slot; and
   a pair of isometric beams, one end of each of which is pivotally connected to the association pillar and the other ends of which are respectively pivotally connected to two places on the top plates of the two holders, wherein when there is a displacement of the association pillar in the guide slot, each drive of the isometric beams enables the two top plates of the holders to move along a second axis to move closer to or away from each other, wherein the first axis and second axis are essentially mutually perpendicular.

2. The size-adjustable stereo imaging clamping device as claimed in claim 1, wherein the lengths of the pair of isometric beams are the same and the distances between two places pivotally connected to one end of each isometric beam and every point along the median line paralleling the first axis of the guide slot are essentially the same, whereby when there is a displacement of the association pillar in the guide slot, each drive of the isometric beams enables the two top plates of the holders to move equal distances closer to or away from each other.

3. The size-adjustable stereo imaging clamping device as claimed in claim 2, further comprising at least one elastic element, an end of which is connected to one of the pair of the holders and the other end of which is connected to the other holder.

4. The size-adjustable stereo imaging clamping device as claimed in claim 3, wherein each of the top plates of the holders comprises at least one hook, the hook of one top plate corresponds to the other hook of the other top plate, and two ends of at least one elastic element are connected to the hooks of the top plates respectively.

5. The size-adjustable stereo imaging clamping device as claimed in claim 4, wherein the top plate comprises a pair of slides, and two corresponding sides of the bottom plate respectively extend two corresponding fringes of the square-based pyramid to form flanges for being fixed to each of the slides.

6. The size-adjustable stereo imaging clamping device as claimed in claim 5, wherein when the pair of the clamping elements clamp the handheld electronic device, the top of the square-based pyramid touches a surface of the handheld electronic device.

7. The size-adjustable stereo imaging clamping device as claimed in claim 1, wherein the guide slot comprises an installing hole and the association pillar comprises a screw, and the bore diameter of the installing hole is greater than the bore diameter of the screw head of the screw such that the screw can be fastened in the guide slot via the installing hole.

8. The size-adjustable stereo imaging clamping device as claimed in claim 1, wherein the top plate comprises a pair of slides, and two corresponding sides of the bottom plate respectively extend two corresponding fringes of the square-based pyramid to form flanges for being fixed to each of the slides.

9. The size-adjustable stereo imaging clamping device as claimed in claim 1, wherein when the pair of the clamping elements clamp the handheld electronic device, the top of the square-based pyramid touches a surface of the handheld electronic device.

* * * * *